United States Patent [19]
Asakura

[11] Patent Number: 5,559,914
[45] Date of Patent: Sep. 24, 1996

[54] COMPONENTS FOR OPTICAL CIRCUITS AND METHOD OF MANUFACTURING THE SAME

[75] Inventor: Hiroyuki Asakura, Osaka, Japan

[73] Assignee: Matsushita Electric Industrial Co., Ltd., Osaka, Japan

[21] Appl. No.: 321,615

[22] Filed: Oct. 12, 1994

[30] Foreign Application Priority Data

Oct. 19, 1993 [JP] Japan ................................. 5-260510
Apr. 14, 1994 [JP] Japan ................................. 6-076079

[51] Int. Cl.⁶ .................................................. G02B 6/43
[52] U.S. Cl. ............................................ 385/49; 385/14
[58] Field of Search .............................. 385/49, 14, 42, 385/40, 2, 8

[56] References Cited

U.S. PATENT DOCUMENTS

| | | | |
|---|---|---|---|
| 4,904,036 | 2/1990 | Blonder | 385/14 |
| 5,179,609 | 1/1993 | Blonder et al. | 38/89 |
| 5,208,884 | 5/1993 | Groh et al. | 385/46 |
| 5,311,604 | 5/1994 | Rogner et al. | 385/14 |

FOREIGN PATENT DOCUMENTS

| | | | |
|---|---|---|---|
| 0331338 | 9/1989 | European Pat. Off. | 385/14 |
| 0451549 | 10/1991 | European Pat. Off. | 385/14 |
| 0560043 | 9/1993 | European Pat. Off. . | |
| 0562699 | 9/1993 | European Pat. Off. . | |

Primary Examiner—John D. Lee
Assistant Examiner—Phan T. H. Palmer
Attorney, Agent, or Firm—Ratner & Prestia

[57] ABSTRACT

An optical waveguide groove 4 and a reference groove 3 for fixing single or plural optical fibers 5 are formed on a glass submount 1 by using forms, a submount 2 having the refractive index equal to or close to that of the glass submount 1 is glued to the optical waveguide having the optical waveguide groove 4, and the recess of the optical waveguide groove 4 is filled up with a material 11 having a refractive index higher than that of the glass substrate 1, thereby composing an optical waveguide, and optical fibers 2 and electronic circuits 8 are mounted on the transparent submount 1 by the formed reference groove or positioning markers by using forms, thereby providing components for optical circuits excellent in bonding, fixing and mounting of optical waveguide with optical fibers, and semiconductor devices, and the method of manufacturing the same.

8 Claims, 17 Drawing Sheets

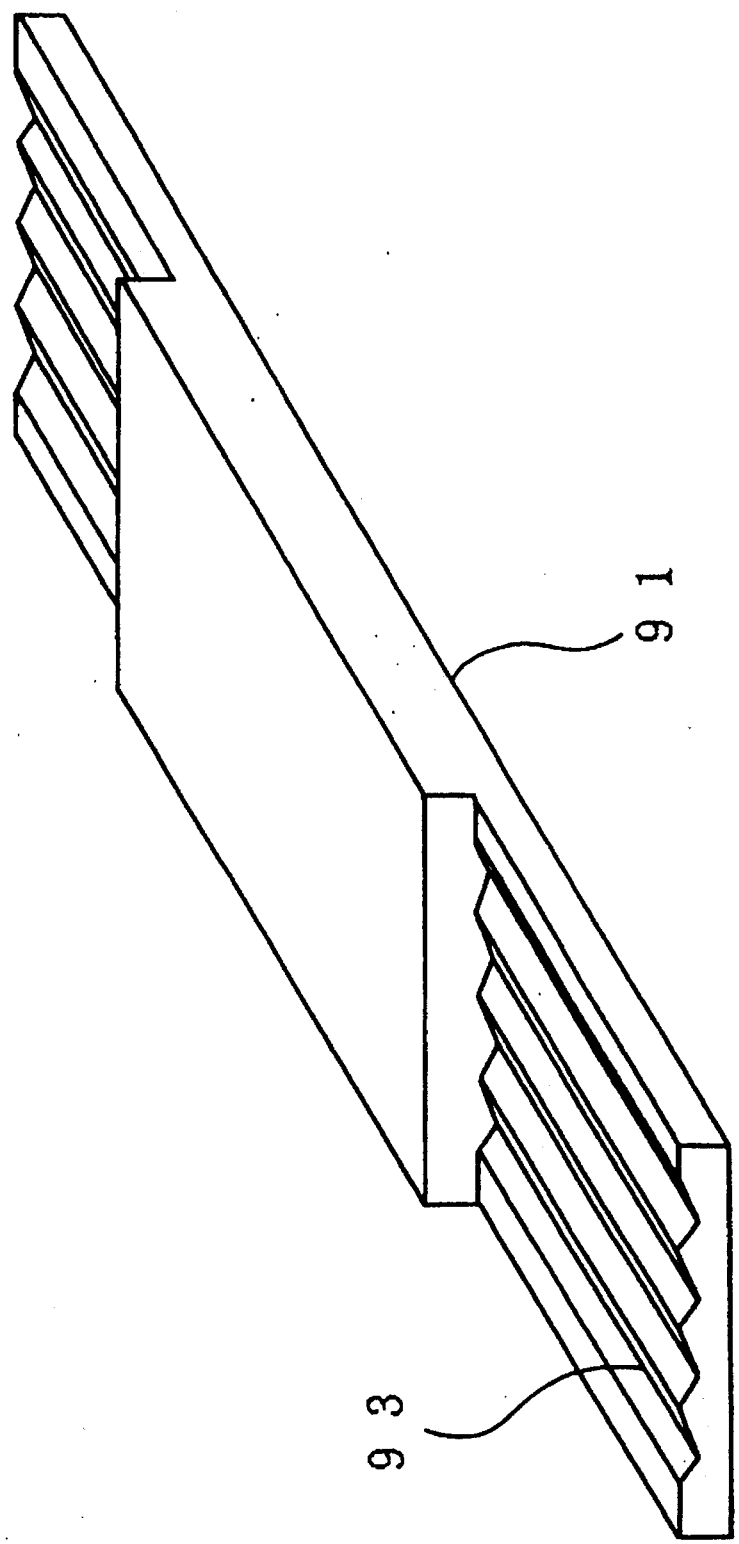

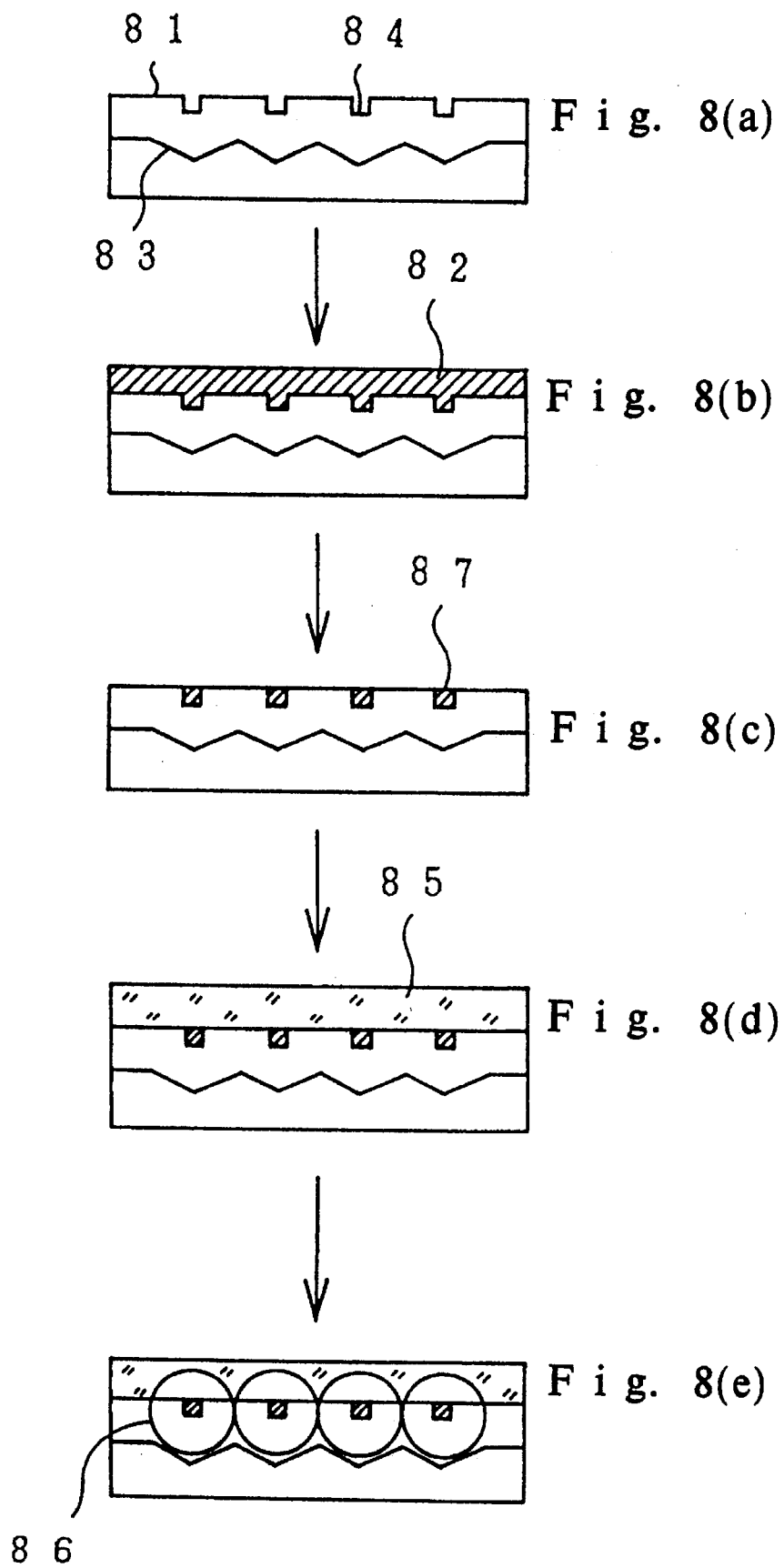

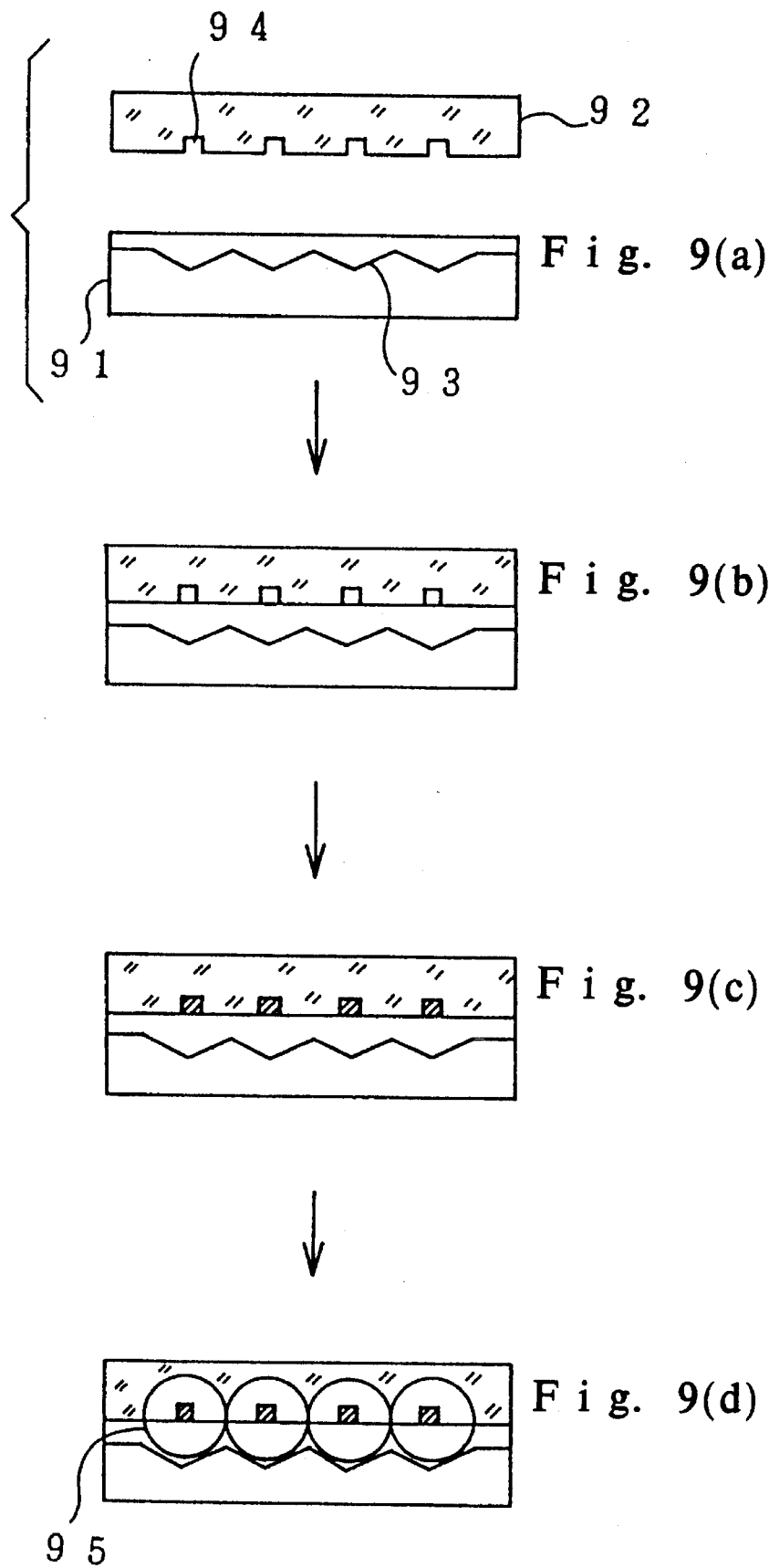

COMPONENTS FOR OPTICAL CIRCUITS AND METHOD OF MANUFACTURING THE SAME

BACKGROUND OF THE INVENTION

1. Field of the Invention

The present invention relates to optical communications, more particularly to components for optical circuits intended to improve bonding, fixing and mounting of optical waveguide with optical fiber and semiconductor device in a module using optical waveguide, and a method of manufacturing the same.

2. Description of the Prior Art

The advance of optical communications is dramatic recently, and applications and practical use are promoted in public communications, CATV, computer networks, etc. From the viewpoint of components, however, there are problems for reduction of size and enhancement of mass producibility in order to spread more widely. For example, an optical transmitter-receiver comprises a laser driving circuit, a photo detector, a demodulating circuit, and optical fibers. It is required to adjust, assemble, and mount these optical and electrical components at high precision. Many components and assembling processes are needed. Further distribution of optical communication systems demands smaller size, multiple functions, higher degree of integration, and lower cost of components for optical circuits. In particular, for installation of subscriber optical communication systems, reduction of size and lowering of cost of components for optical circuits are important subjects.

On the other hand, required functions of subscriber system include, among others, the functions of wavelength division multiplexing and bi-directional transmission by making use of the broad band properties of optical communications. For integration of functions, several optical circuit submounts using optical waveguide have been proposed. For example, according to a proposed optical module, a silica-based optical waveguide is formed on a silicon submount by flame-hydrolysis deposition, and further metal electrodes are wired, and semiconductor devices and electric circuits are mounted, and optical fibers are arranged and connected on the submount forming V-grooves.

In such conventional components for optical circuits, the submount mounting optical waveguides, light emitting devices, light receiving devices, and electrode wiring is separate from the submount for fixing optical fibers. To bond the optical waveguide and optical fibers at low loss, it is required to adjust, assemble and fix at a precision of 1 micro-m or less. For fabrication of submount for fixing optical fibers, selective etching of silicon submount, and V-groove method by cutting ceramic submount are employed. They have their own problems in processing precision and mass producibility. In the silicon submount, a precise V-groove can be formed by etching, but since the shape is limited to V-form, the restrictions on processing shape are large. It is also required to match the crystal orientation of etching mask and silicon submount at high precision. Furthermore, if the materials of optical waveguide submount and groove submount are different, they differ in the coefficient of linear expansion, and therefore the characteristic varies with temperature fluctuations. When mounting semiconductor devices and electric parts on a silicon submount, it is necessary to form an insulation layer on the submount. If semiconductor devices are directly formed on the silicon submount, the area occupied by the optical waveguide increases, and the number of devices obtained from one wafer is small, and the cost is not lowered.

SUMMARY OF THE INVENTION

It is hence a primary object of the invention to present components for optical circuits of low cost, excellent in bonding, fixing and mounting of optical waveguide with optical fiber and semiconductor device, and method of manufacturing the same.

To achieve the object, the invention presents a constitution of components for optical circuits by forming the optical waveguide and optical fiber fixing part on one transparent submount, and a manufacturing method of forming by using mold dies.

In this constitution and manufacturing method, components for optical circuits of low cost and superb productivity, excellent in bonding, fixing and mounting of optical waveguide with optical fibers and mounting devices, and method of manufacturing such components for optical circuits are presented.

BRIEF DESCRIPTION OF THE DRAWING

FIGS. 8a–8e are a process diagram of manufacturing method of components for optical circuits in a sixth embodiment of the invention.

FIGS. 9a–9d are a process diagram of manufacturing method of components for optical circuits in a seventh embodiment of the invention.

FIG. 10 is a perspective view of submount components for fixing fibers in an eighth embodiment of the invention.

DESCRIPTION OF THE PREFERRED EMBODIMENTS

Figure 1:
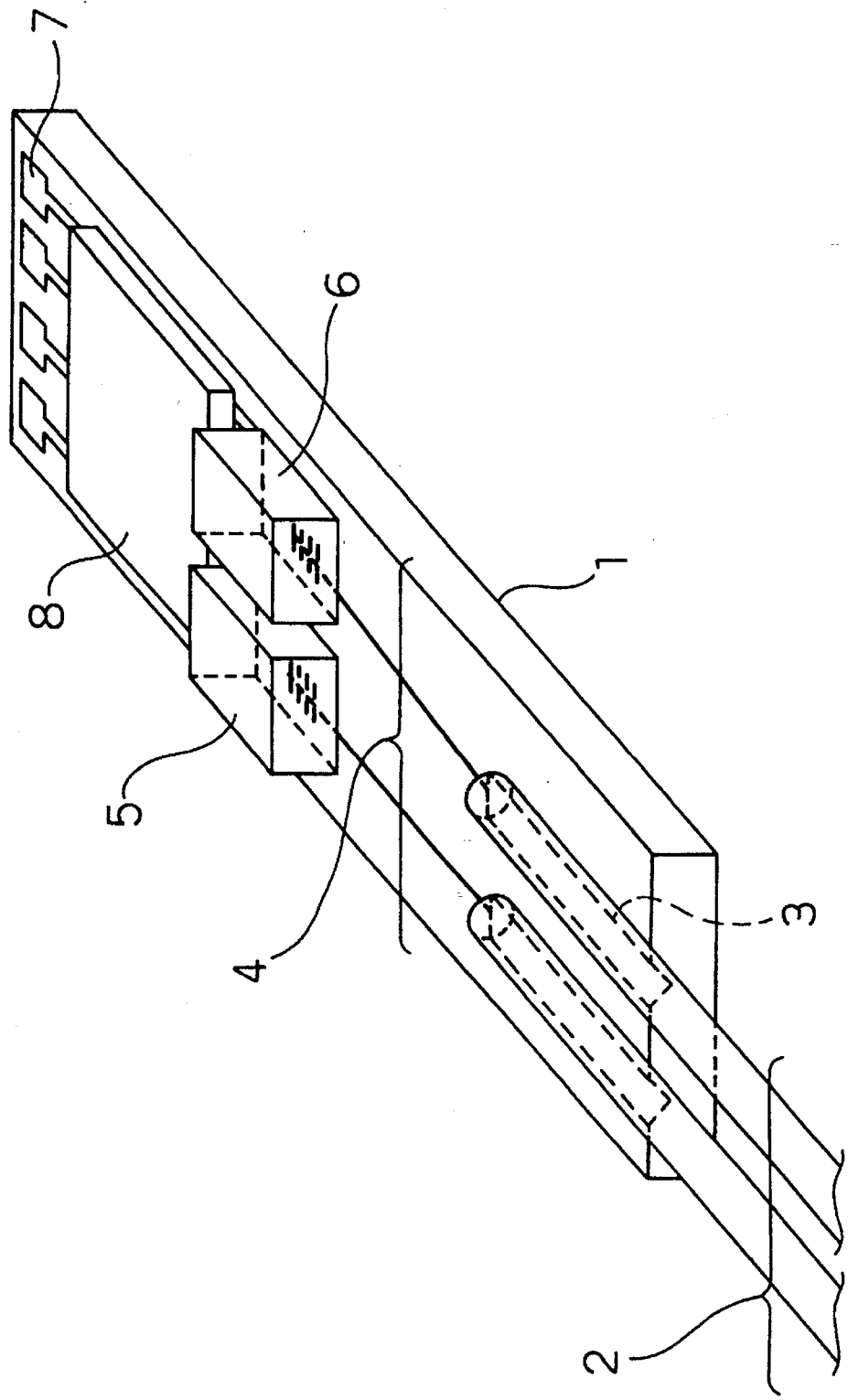
FIG. 1 is a structural diagram of components for optical circuits in a first embodiment of the invention.

Referring now to the drawings, components for optical circuits of the invention are described in detail below. FIG. 1 shows module components for optical transmission and reception as components for optical circuits in a first embodiment of the invention. Reference numeral 1 in FIG. 1 is a transparent submount made of glass or resin, in which optical fiber fixing grooves 3 for fixing optical fibers 2, and optical waveguides 4 consecutive thereto are formed. Moreover, a light emitting device 5, a light receiving device 6, electrode wiring 7, electronic circuits 8 or semiconductor devices, IC, and LSI are mounted. They are constituted so as to process electric signals that are transmitted and received. In this embodiment, the light transmitter and receiver are formed in one module. More specifically, the optical fibers 2 transmit and receive optical signals, and the optical waveguides 4 couple the light of the light emitting device 5 and light receiving device 6. In the electronic circuits 8, modulation of the light emitting device 5 by transmission signal, and amplification and demodulation of signal from the light receiving device 6 are performed.

The manufacturing process of the invention is shown in FIG. 2. In the first place, optical fiber fixing grooves 3 and optical waveguides 4 are formed on the transparent submount 1 of glass or resin by using forms (not shown) (FIG. 2a, b). As the optical waveguides, convex rib structures are formed, or concave structures may be filled with a transparent material having a higher refractive index than the transparent submount 1. It is not necessary to form the optical waveguides directly, but only a flat submount may be formed and optical waveguides may be formed in a later process according to the desired characteristics. In this case, preferably, optical waveguides are formed by using different forms, or quartz optical waveguides are formed by flame-hyrolysis deposition, optical waveguides are formed by ion exchange method or sputtering method, optical waveguides are formed by using macromolecular resin, or organic crystal optical waveguides are formed.

By exchanging the steps, moreover, fiber fixing grooves may be formed by using forms on the transparent glass or resin submount on which optical waveguides are already formed.

Figure 2B:
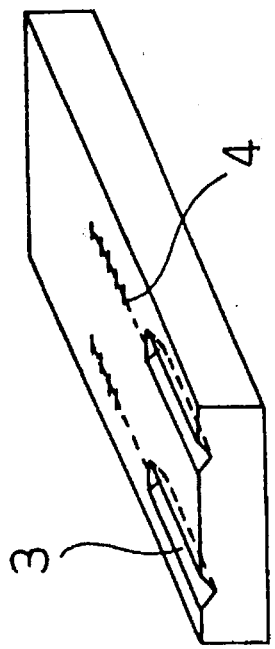
FIGS. 2a–2d are a perspective view showing manufacturing process of components for optical circuits in the first embodiment of the invention.
Figure 2D:
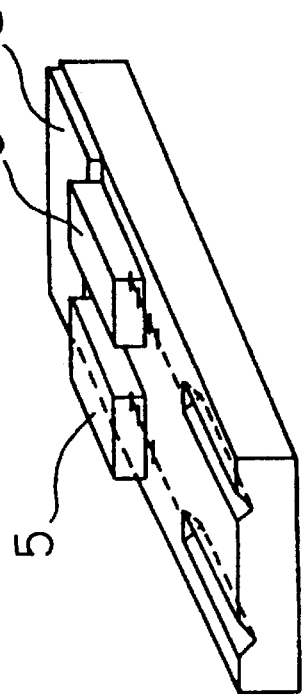
Figure 2A:
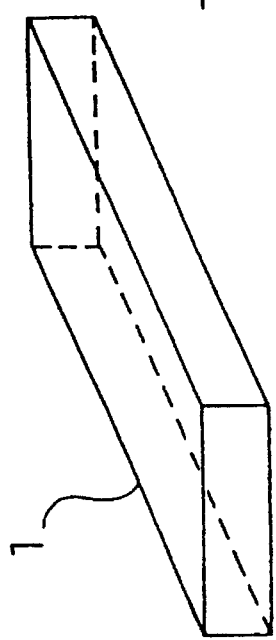
Figure 2C:
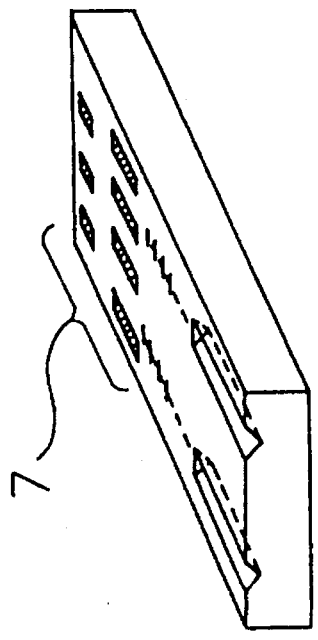

Consequently, electrode patterns are formed on the submount 1, and further the light emitting device 5, light receiving device 6, and electronic circuits 8 are mounted (FIG. 2c, d). By using nonconductive material such as glass and resin in the submount 1, it is not necessary to form insulation layer between the submount 1 and electrode wiring 7, so that the process may be simplified. By the self-aligning type flip chip method for mounting components for electronic circuits directly on the submount 1, optical fibers are fixed to the optical fiber fixing grooves 3, so that the components can be assembled without adjustment.

Fibers can be fixed by adhering with resin, by using low melting glass, or by soldering. As a result, the transmitter and receiver are formed on one submount 1, and an optical transmitter-receiver module is completed.

In this embodiment, the transmitter and receiver are formed in one body, but this is not limitative, and the transmitter and receiver may be separate, or a branching function may be provided.

In FIG. 2(a), (b), using the submount 1 on which the optical waveguides 4 are already formed, the optical fiber fixing grooves 3 may be formed. As the submount, meanwhile, submount materials such as resin and glass may be directly formed by injection.

Figure 3:
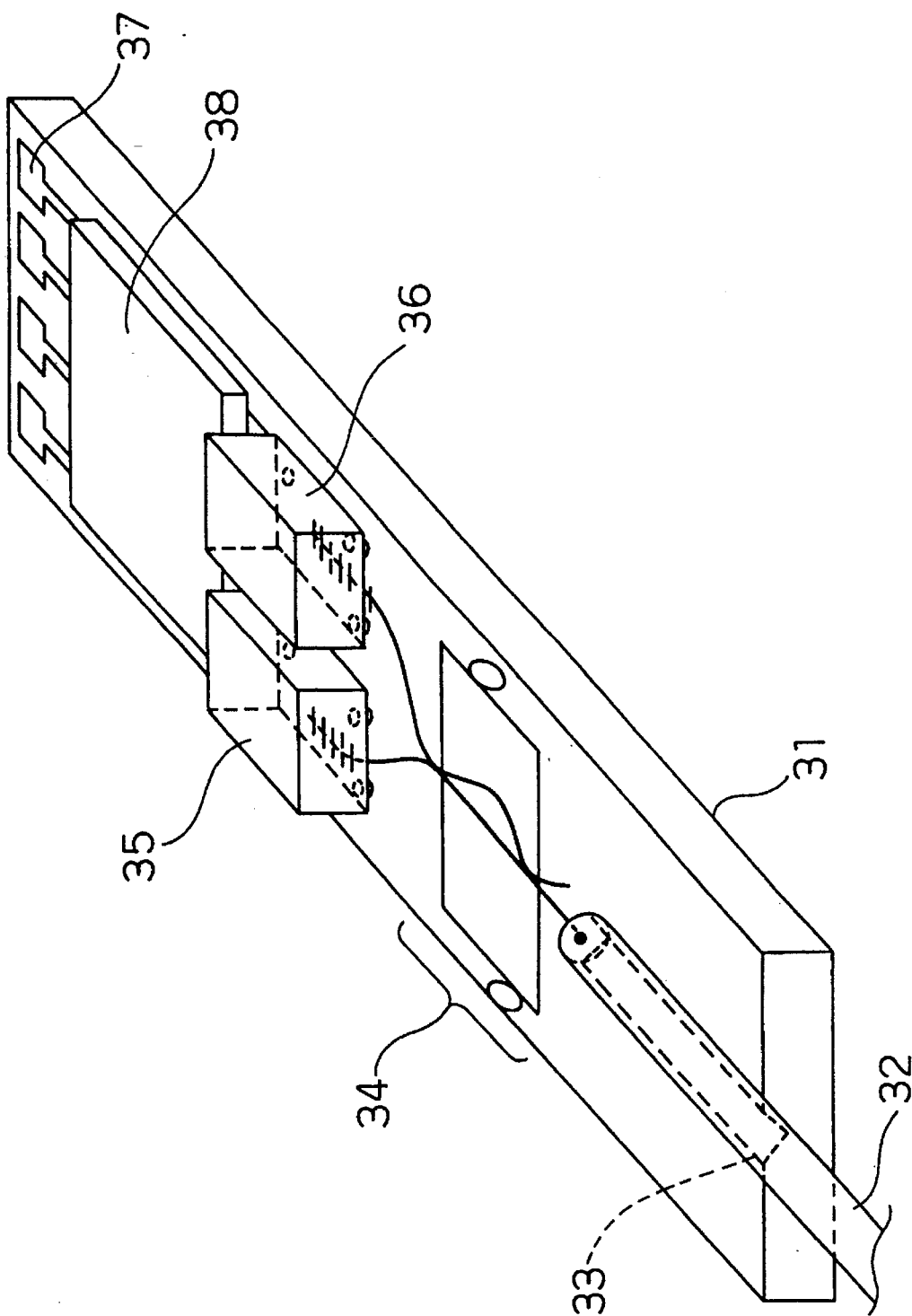
FIG. 3 is a structural diagram of components for optical circuits in a second embodiment of the invention.

A second embodiment of the invention is described in FIG. 3. Reference numeral 31 in the drawing is a transparent submount, in which an optical fiber fixing groove 33 for fixing an optical fiber 32, and an optical waveguide 34 for bi-directional communications are formed. Moreover, a light emitting device 35, a light receiving device 36, electrode wiring 37, and electronic components 38 are mounted on the submount 31, and electric signals of transmission and reception are processed. Its feature is that transmission and reception can be done by one optical fiber 32 owing to the bi-directional function of the optical waveguide 34.

The manufacturing method is same as in the preceding embodiment. Besides, a varied function module can be presented by adding functions of modulation, waveform selection switch and others to the optical waveguide 34.

Figure 4:
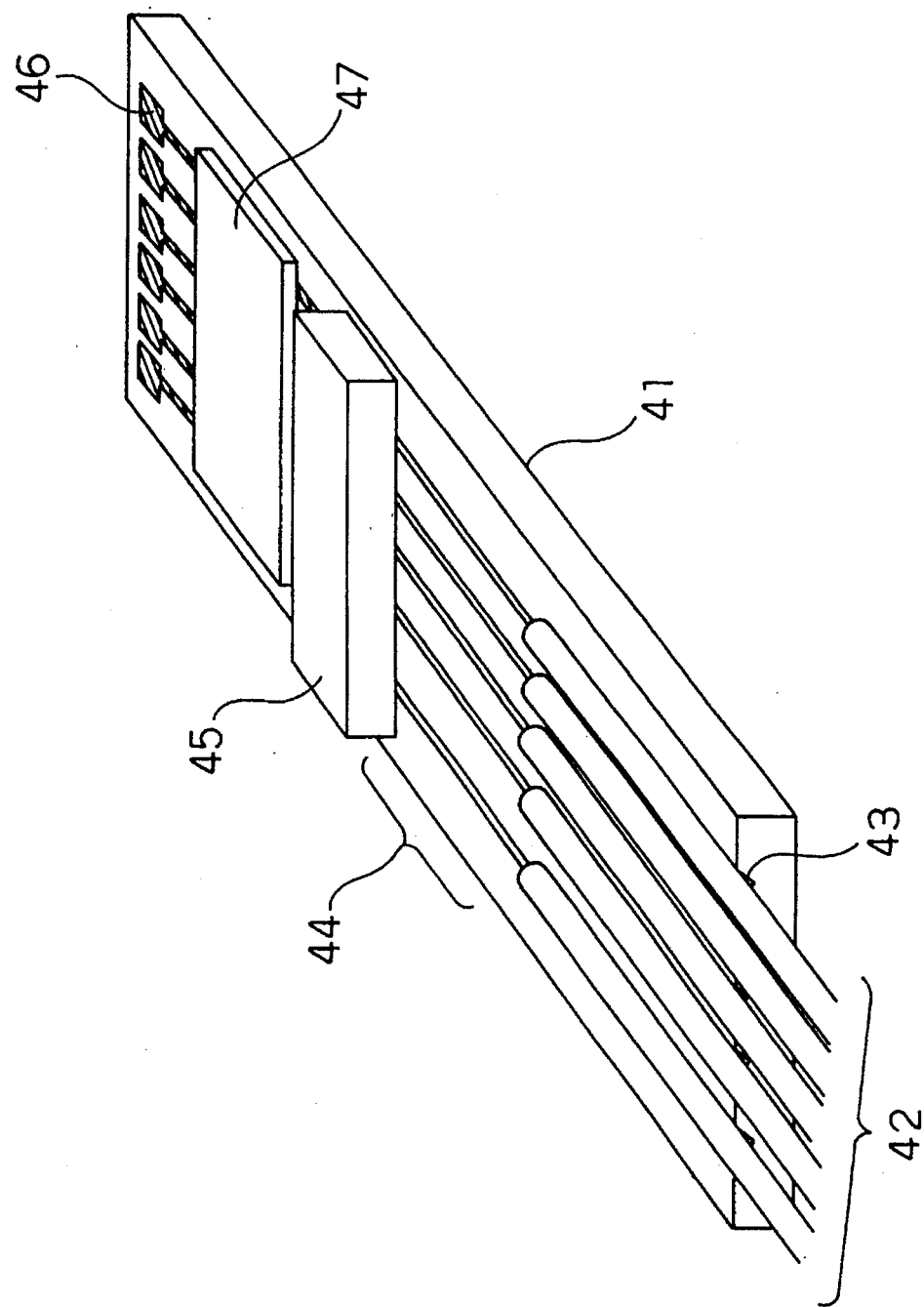
FIG. 4 is a structural diagram of components for optical circuits in a third embodiment of the invention.

Optical module components for parallel multi-channel transmission of signals is shown in FIG. 4 as a third embodiment of the invention. That is, reference numeral 41 in the drawing is a transparent submount, on which are formed optical fiber fixing grooves 43 for fixing optical fibers 42, and optical waveguides 44, and moreover a light emitting device array or light receiving device array 45, electrode wiring 46, and electronic components 47 are mounted. Its feature is that plural transmitters or receivers can be easily mounted on one submount. The manufacturing method is same as in the first embodiment.

Figure 5:
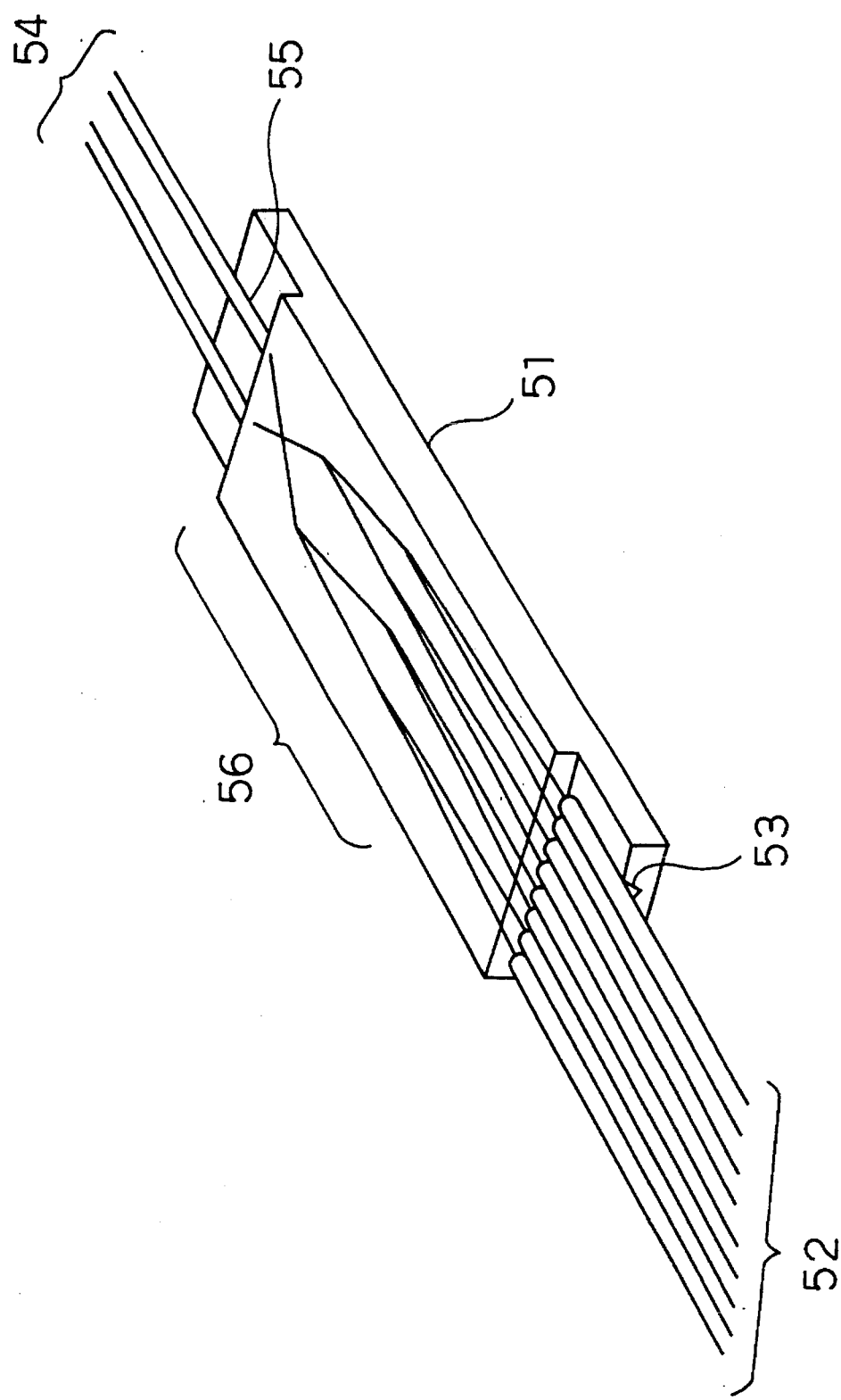
FIG. 5 is a structural diagram of components for optical circuits in a fourth embodiment of the invention.

An optical coupler as a fourth embodiment of the invention is shown in FIG. 5. In the drawing, reference 51 is a transparent submount, and optical fibers fixing grooves 53, 55 for fixing optical fibers 52, 54, and optical waveguides 56 are formed thereon, and the optical waveguides have a branching and coupling function. In this embodiment, the optical fibers 52 and 54 can be assembled and mounted without aligning. The manufacturing method is nearly same as in the first embodiment, except that electrode wiring and electronic circuit mounting are not necessary. However, at the input side and output side of the optical waveguides 56, optical fibers 52, 54, and fixing grooves 53, 55 are needed.

FIG. 6 shows the process of second manufacturing method of components for optical circuits of the invention. First, on a transparent submount 61 of glass or resin, an optical fiber fixing (as reference) groove 63 and optical waveguide groove 64 are formed by using forms (not shown) (FIG. 6a). FIG. 5 is a perspective view of the formed submount 61. Herein is shown an example of star coupler of 4:4, but this is not limitative. The electronic circuit components mentioned in the foregoing embodiment may be mounted. Next, on the submount 61 thus forming concave optical waveguide grooves 64, a transparent submount 62 of glass or resin having a refractive index close to that of the submount 61, preferably with a refractive index difference of 0.05 or less, more preferably 0.01 or less, is glued together by direct junction by heat treatment or by adhesion (FIG. 6b). The recess of the optical waveguide grooves 64 is filled with a transparent material 66 having a higher value than the refractive index of the submount 61 or 62 (FIG. 6c). Afterwards, an optical fiber 65 is fixed to the optical fiber fixing groove 63 (FIG. 6d). An organic material having a nonlinear effect may be used in the transparent material 6.6. In this case, by applying an electric field or the like to the optical waveguide, the function of switching, modulation, wavelength selection, or the like can be achieved. Meanwhile, the adhesive for joining the submount 62 may be also used as the filler of the optical waveguide groove 64.

FIG. 8 shows the process of a third manufacturing method of components for optical circuits of the invention. First, on a transparent submount 81 of glass or resin, optical fiber fixing grooves 83 and optical waveguide grooves 84 are formed by using forms (not shown) (FIG. 8a). In consequence, to embed the optical waveguide grooves 84, a buried layer 82 having a higher refractive index than that of the submount 81 is formed entirely (FIG. 8b). Then, the buried layer 82 other than the optical waveguide 87 of the optical waveguide groove 84 is removed by polishing or etching (FIG. 8c). Next, a transparent submount 85 of glass or resin having a refractive index equal or close to that of the submount 81 is adhered by direct-bonding by heat treatment or by adhesion (FIG. 8d). Afterwards, the optical fiber 86 is fixed in the optical fiber fixing groove 83 (FIG. 8e).

Figure 11:
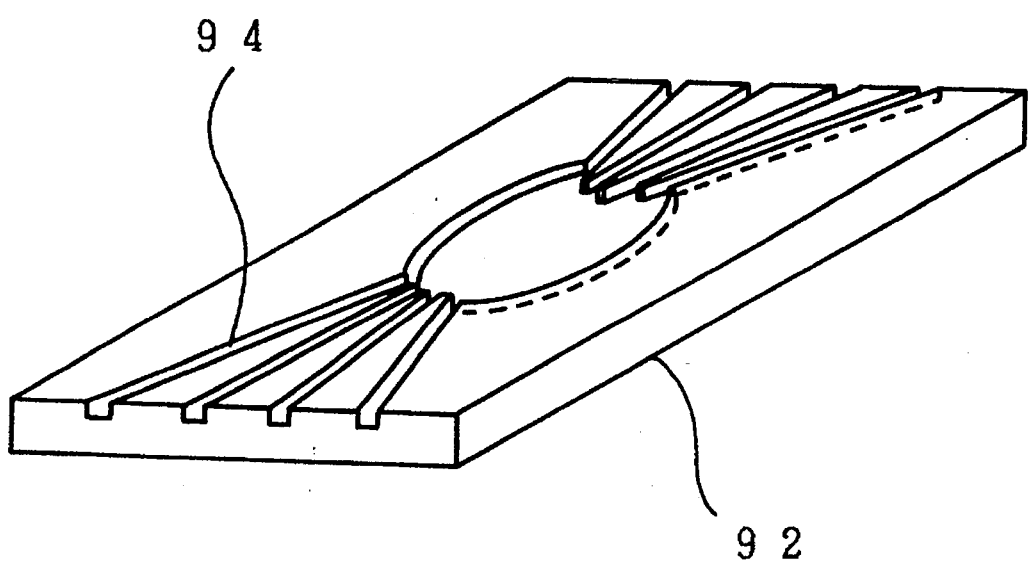
FIG. 11 is a perspective view of submount components for optical waveguide in the eighth embodiment of the invention.

FIG. 9 shows the process of a fourth manufacturing method of the invention. Using forms (not shown), in the first place, optical waveguide grooves 94 are formed in an optical waveguide submount 92. On a transparent fiber fixing submount 91 of glass or resin having a refractive index equal or close to that of the submount 92, optical fiber fixing grooves 93 are formed by using forms (not shown) (FIG. 9a). FIG. 10 shows the fiber fixing submount 91 after forming, and FIG. 11 shows the optical waveguide submount 92 after forming, both in perspective view. Consequently, the submount 92 forming the optical waveguide groove 94 and the submount 91 forming the fiber fixing groove 93 are joined together by heat treatment (FIG. 9b). The optical waveguide groove 94 is filled with a transparent material having a refractive index higher than that of the submount 91 or 92 (FIG. 9c). Then the optical fiber 95 is fixed to the optical fiber fixing groove 93 (FIG. 9d). By using the submount 92 differing in the pattern of the optical waveguide groove 94, an optical circuit having a different function can be easily presented by the same method of manufacture.

Figure 12:
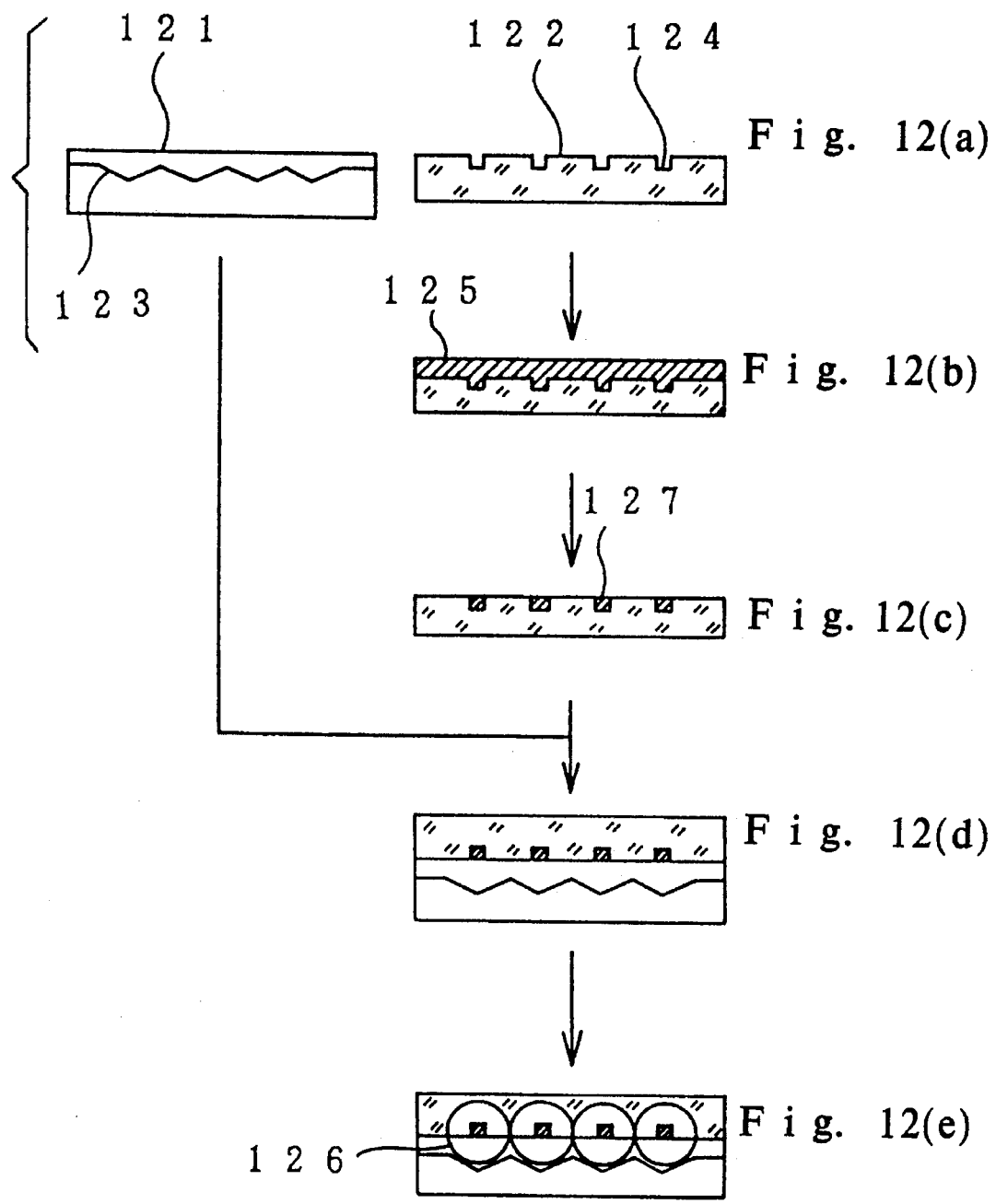
FIGS. 12a–12e are a process diagram of manufacturing method of components for optical circuits in a ninth embodiment of the invention.

FIG. 12 shows the process of a fifth manufacturing method of the invention. First, optical waveguide grooves 124 are formed by using forms (not shown) on a transparent optical waveguide submount 122 of glass or resin. Optical fiber fixing grooves 123 are formed by using forms (not shown) on a transparent optical fiber fixing submount 121 made of resin or glass having a refractive index equal or close to that of the submount 122 (FIG. 12a). In consequence, on the optical waveguide submount 122, in order to fill up the recess in the optical waveguide grooves 124, a glass buried layer 125 having a refractive index higher tan that of the optical waveguide submount 122 is formed (FIG. 12b). The buried layer 125 other than the optical waveguide 127 having the optical waveguide groove 124 is removed by polishing or etching (FIG. 12c). Afterwards, the submount 122 and optical fiber fixing submount 121 are joined together by heat treatment or direct junction (FIG. 12d). Then the optical fiber 126 is fixed to the optical fiber fixing groove 123 (FIG. 12e).

Figure 13:
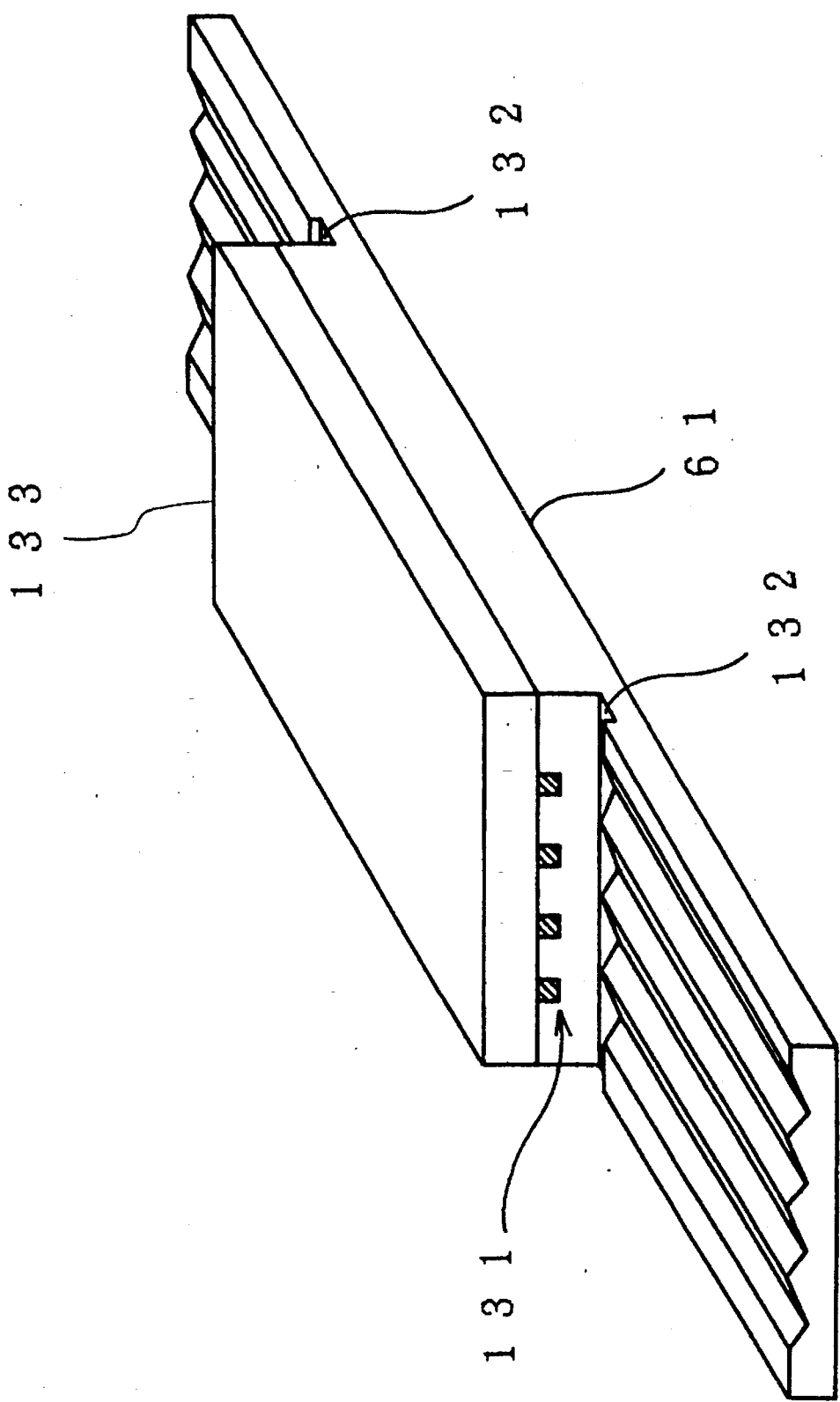
FIG. 13 is a perspective view of components for optical circuits in a tenth embodiment of the invention.
Figure 14:
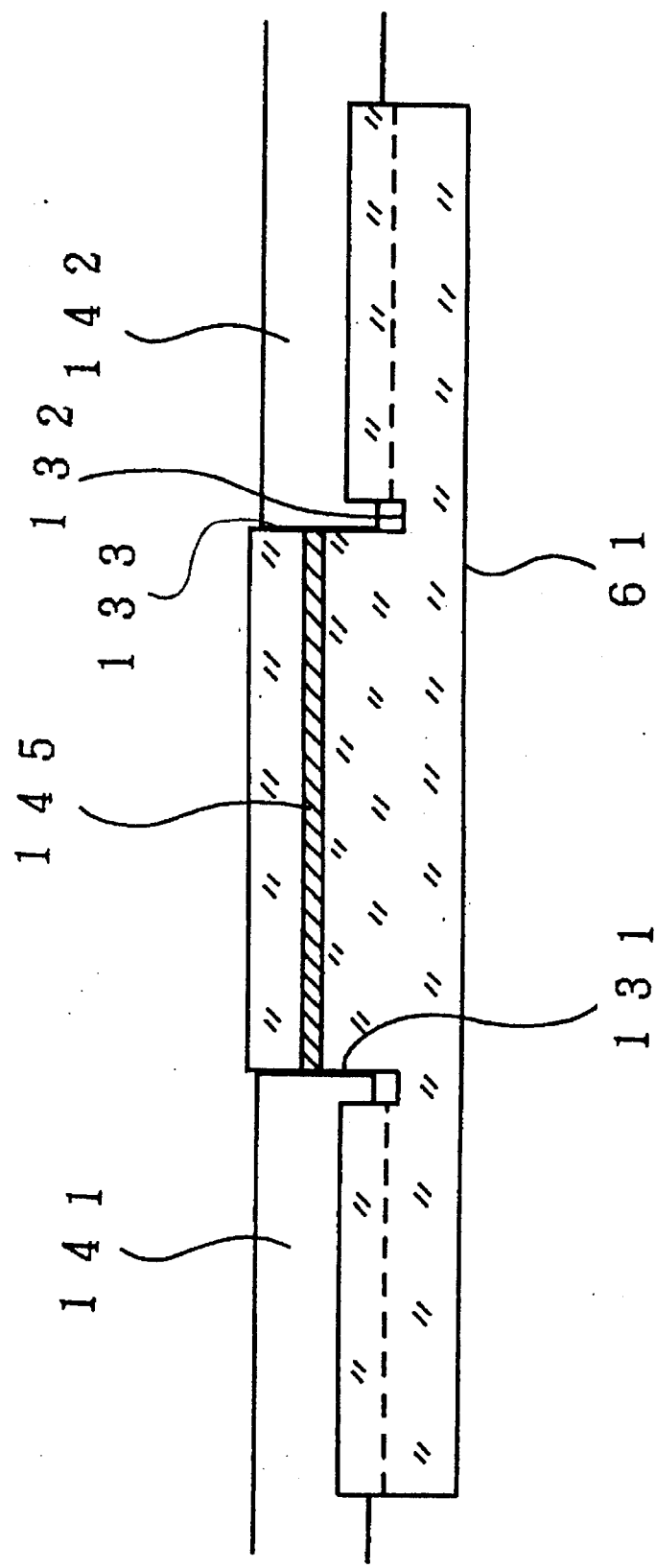
FIG. 14 is a side view of components for optical circuits in the tenth embodiment of the invention.

As shown in FIG. 13, in any manufacturing method mentioned so far, it is preferred to flatten the optical waveguide side end faces by polishing and cutting the portion having the end portion of the optical waveguide and the portion having the fixing groove end (at the confronting position) adjacent to the end portion, simultaneously by a specific width. This is an art for solving the problem of the manufacturing method. That is, in the shown manufacturing method, when upper and lower submounts are glued together, there may be deviation in precision of joining, distortion in the optical waveguide end portions 131, 133 when forming grooves, or oozing of the adhesive to outside, and due to such various causes, if the optical fiber is placed in the fixing groove, the optical fiber end may not be accurately positioned and adjusted at the optical waveguide groove end. By flattening around the optical waveguide groove end by polishing or cutting as mentioned above, therefore, the optical fiber end can be positioned and adjusted accurately at the optical waveguide groove end. Hence, the fiber and optical waveguide can be connected at low loss. FIG. 14 is a side view when the optical fibers 141, 142 are mounted on the submount 61 after polishing and cutting in this manner. By flattening the optical waveguide end faces 131, 133, the optical fiber 141, 142 can be tightly connected to the optical waveguide 145. Preferably, the junction of the fiber and optical waveguide is adhered or filled with an adhesive matched in the refractive index.

Figure 15:
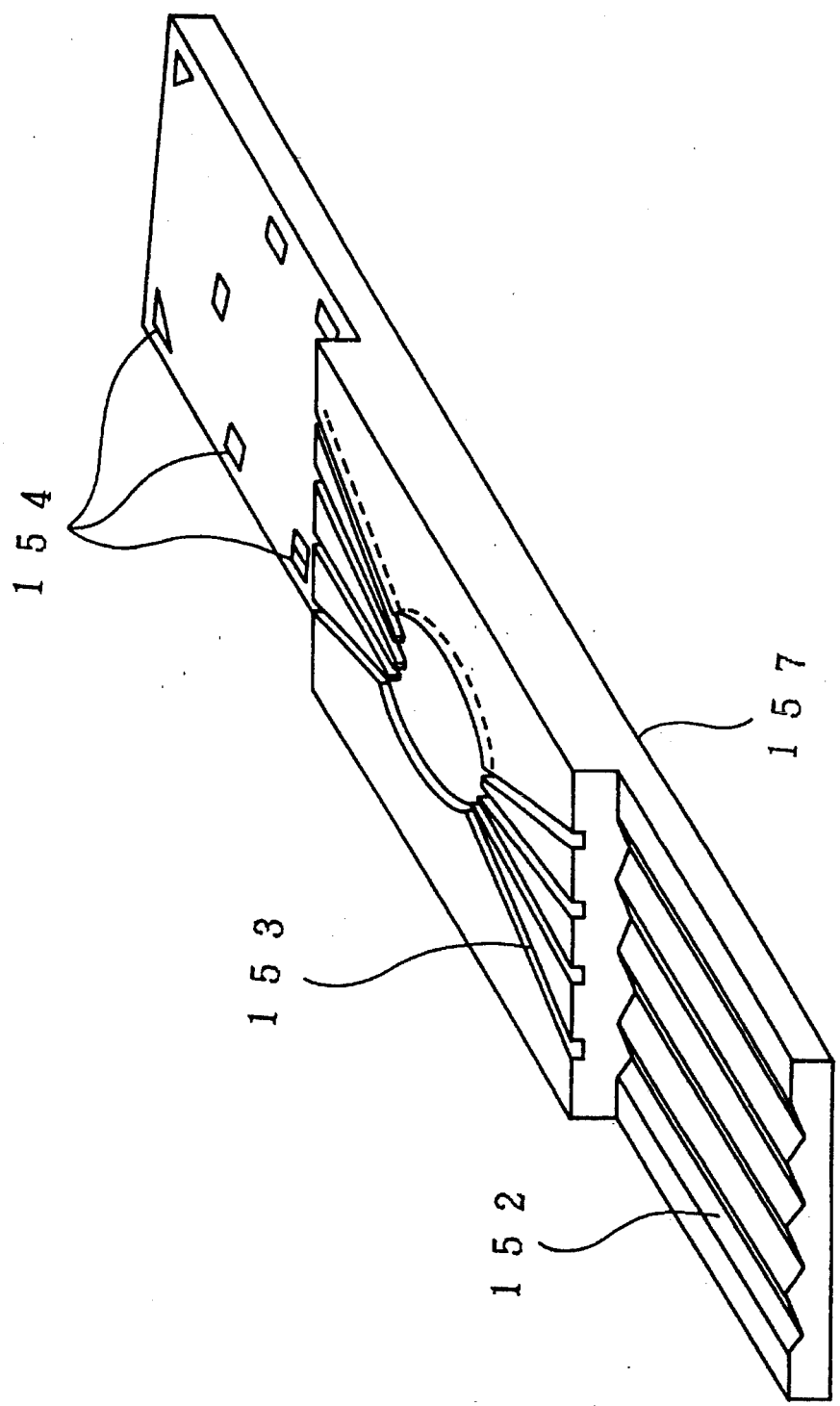
FIG. 15 is a perspective view of components for optical circuits in an eleventh embodiment of the invention.

In forming the fiber fixing groove or optical waveguide groove in the embodiments of the invention, positioning markers may be used for mounting the light emitting device, light receiving device, electrode wiring, electronic circuit, semiconductor device, IC or LSI. The markers may be either convex or concave. FIG. 15 shows a perspective view of a submount with marker marking. By this marker 154, for example, the optical waveguide and mounting device can be positioned precisely.

Figure 16:
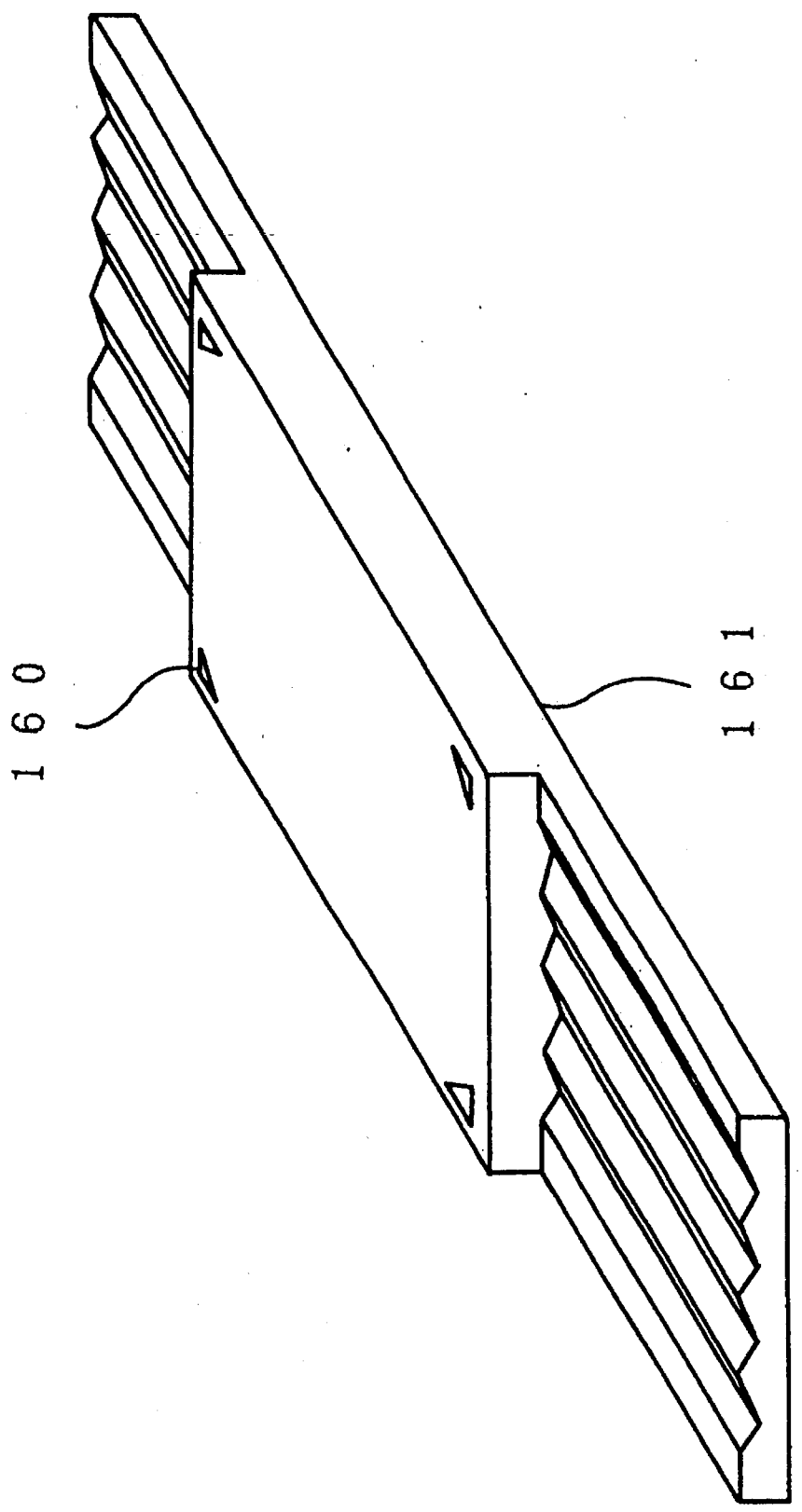
FIG. 16 is a perspective view of components for optical
Figure 17:
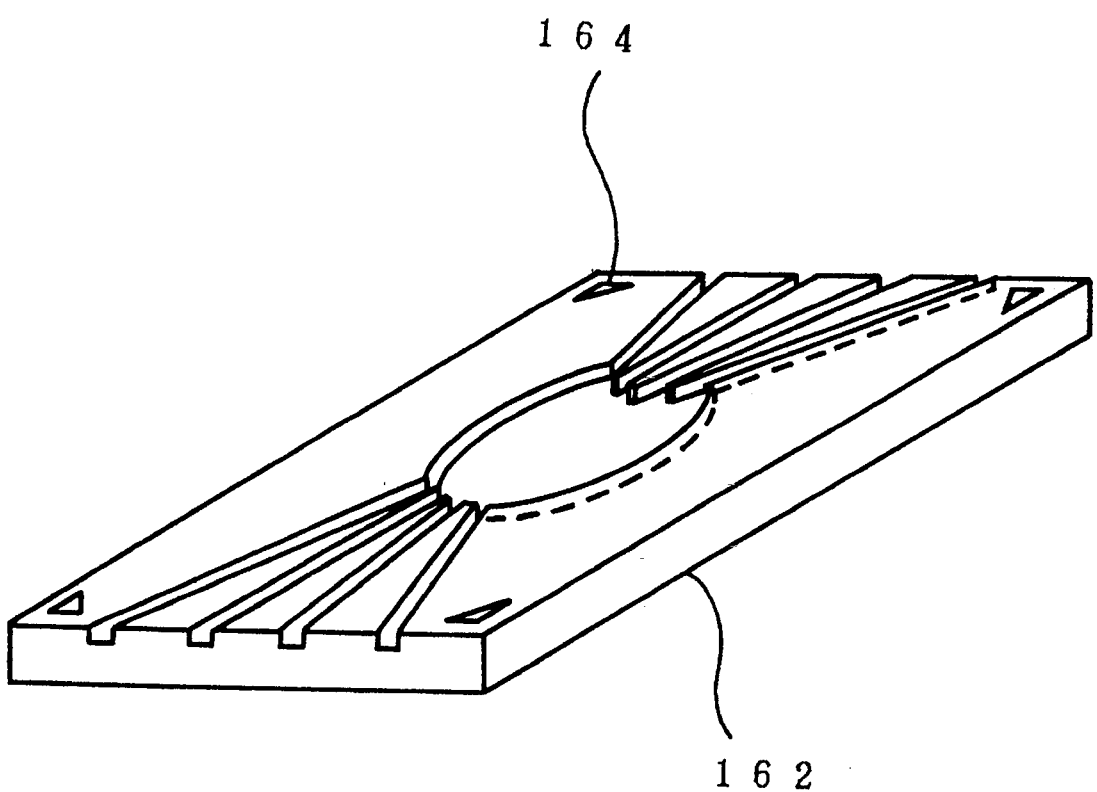
FIG. 17 is a perspective view of components for optical circuits in the twelfth embodiment of the invention.
Figure 6A:
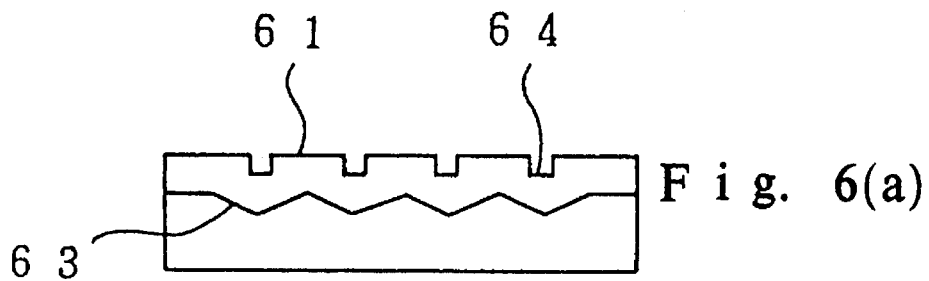
FIGS. 6a–6d are a process diagram of manufacturing method of components for optical circuits in a fifth embodiment of the invention.
Figure 6B:
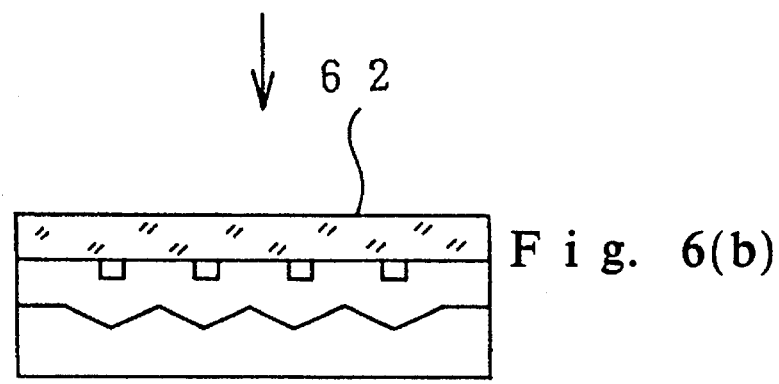
Figure 6C:
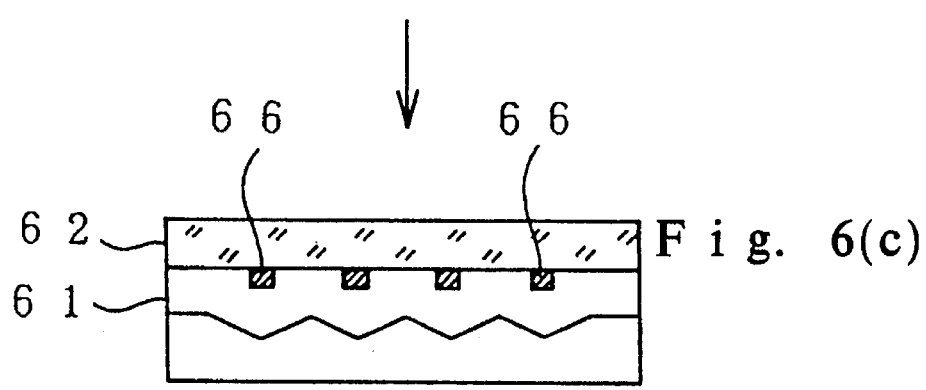
Figure 6D:
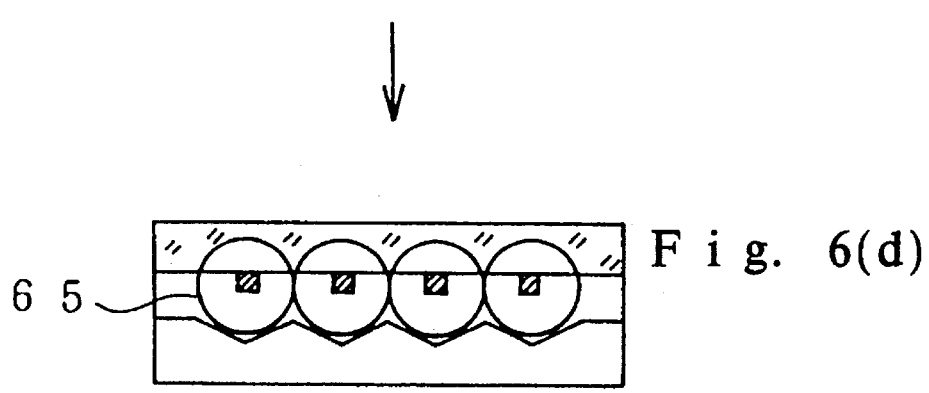
Figure 7:
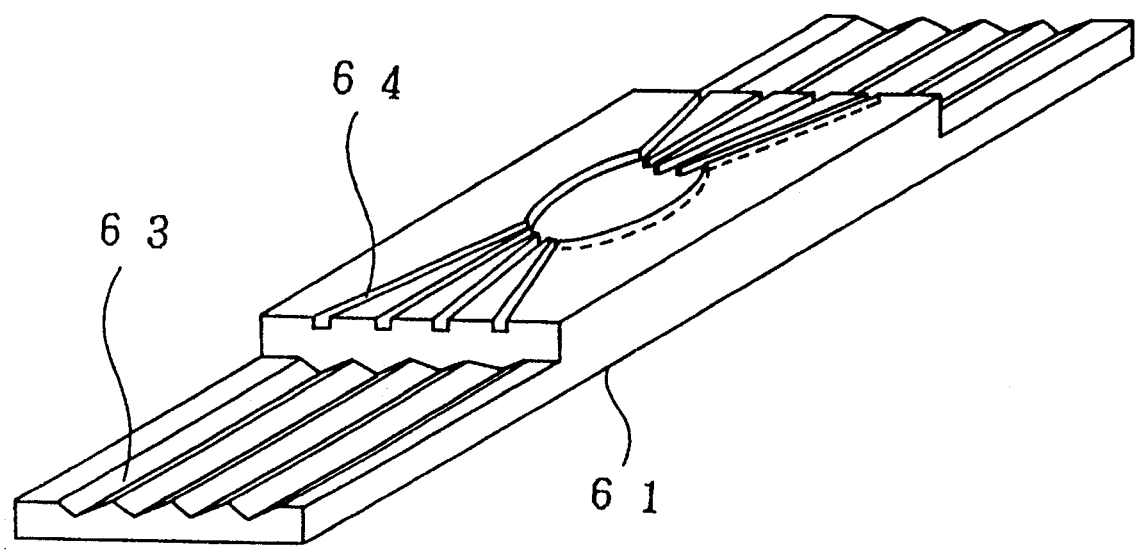
FIG. 7 is a perspective view of components for optical circuits in the fifth embodiment of the invention.

The marker may be also used for gluing the fiber fixing submount 161 and optical waveguide submount 162 as shown in FIG. 16 and FIG. 17. By matching the marker 160 at the fixing submount 161 side and the marker 164 at the optical waveguide submount 162 side, the optical fiber and the optical waveguide can be positioned accurately, and connected at low loss. In this case, the marker may be mechanically fitted by positioning marks or by combination of recess and process. Preferably, combination of recess and recess, or recess and process may be desired.

Preferably, moreover, the transparent submount is made of a material having a refractive index in a range of 1.45 to 2.5, so that the connection loss and quantity of reflected light can be decreased in the connection of optical fiber and optical waveguide. More preferably, a material having a refractive index same as that of the optical fiber is used. In the invention, however, the refractive index of the transparent submount is not always limited in this range.

What is claimed is:

1. A glass submount for optical circuits comprising:
 a submount part on which an optical waveguide is formed;
 at least one reference groove formed on said submount, having at least one optical fiber disposed in said reference groove;
 a plurality of positioning marks for mounting components formed on said glass submount; and an electronic circuit mounted on said glass submount.

2. An amorphous glass submount for optical circuits comprising:
 a submount pan on which an optical waveguide is formed;
 at least one reference groove formed on said amorphous glass submount, having at least one optical fiber disposed in said reference groove;
 a plurality of positioning marks for mounting components formed on said amorphous glass submount; and
 an electronic circuit mounted on said amorphous glass submount.

3. The amorphous glass submount of claim 2 wherein the amorphous glass submount is electrically insulating.

4. A glass submount for optical circuits comprising:

a submount part on which an optical waveguide is formed;

at least one reference groove formed on said glass submount, having at least one optical fiber disposed in said reference groove;

a plurality of positioning marks for mounting components formed on said glass submount, said positioning marks being one of convex and concave in shape; and an electronic circuit mounted on said glass submount.

5. An amorphous glass submount for optical circuits comprising:

a submount part on which an optical waveguide is formed;

at least one reference groove formed on said amorphous glass submount, having at least one optical fiber disposed in said reference groove;

a plurality of positioning marks for mounting components formed on said amorphous glass submount, said positioning marks being one of convex and concave in shape; and an electronic circuit mounted on said amorphous glass submount.

6. The amorphous glass submount of claim 5 wherein the amorphous glass submount is electrically insulating.

7. An optical circuit comprising:

an electrically insulating amorphous submount on which an optical waveguide is formed, said submount being formed of one of glass and resin;

at least one reference groove formed on said amorphous submount, having at least one optical fiber disposed in said reference groove;

a plurality of positioning marks for mounting components formed on said amorphous submount; and an electronic circuit mounted on said amorphous submount.

8. The optical circuit of claim 7, wherein said positioning marks being one of convex and concave in shape.

* * * * *

UNITED STATES PATENT AND TRADE MARK OFFICE
CERTIFICATE OF CORRECTION

PATENT NO.   : 5,559,914
DATED        : September 24, 1996
INVENTOR(S)  : Asakura It is certified that error appears in the above-identified patent and that said Letters Patent is hereby corrected as shown below:

In column 6, line 52, after the words "submount; and" start a new paragraph with the words "an electronic".

In column 6, line 56, delete "pan" insert therefor --part--.

Signed and Sealed this

Fifteenth Day of April, 1997

Attest:

BRUCE LEHMAN

Attesting Officer

Commissioner of Patents and Trademarks